United States Patent
Bachmeier et al.

(10) Patent No.: US 7,185,219 B1
(45) Date of Patent: Feb. 27, 2007

(54) SYSTEM AND METHOD FOR CLOCK PHASE RECOVERY

(75) Inventors: Felix A. Bachmeier, Folsom, CA (US); Jonathan P. Easter, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 10/830,230

(22) Filed: Apr. 22, 2004

(51) Int. Cl.
*G06F 11/00* (2006.01)
*H04L 7/00* (2006.01)

(52) U.S. Cl. ...................................... 713/503; 713/400
(58) Field of Classification Search ................ 713/400, 713/500, 503; 702/69; 375/69
See application file for complete search history.

(56) References Cited

U.S. PATENT DOCUMENTS

| | | | | |
|---|---|---|---|---|
| 4,819,080 A | * | 4/1989 | Cucchietti et al. | 324/76.77 |
| 5,361,277 A | * | 11/1994 | Grover | 375/356 |
| 5,903,605 A | * | 5/1999 | Crittenden | 375/226 |
| 6,643,612 B1 | * | 11/2003 | Lahat et al. | 702/186 |
| 6,661,860 B1 | * | 12/2003 | Gutnik et al. | 375/354 |
| 6,665,317 B1 | * | 12/2003 | Scott | 370/516 |
| 6,775,300 B2 | * | 8/2004 | Kuo | 370/503 |
| 6,868,534 B2 | * | 3/2005 | Fattouh et al. | 716/6 |
| 6,983,394 B1 | * | 1/2006 | Morrison et al. | 713/500 |
| 2004/0133375 A1 | * | 7/2004 | Kattan | 702/89 |
| 2005/0007952 A1 | * | 1/2005 | Scott | 370/229 |
| 2005/0200393 A1 | * | 9/2005 | Furtner | 327/291 |

\* cited by examiner

*Primary Examiner*—Chun Cao
*Assistant Examiner*—Mark Connolly
(74) *Attorney, Agent, or Firm*—Troutman Sanders LLP; James E. Schutz (57) ABSTRACT

A clock may be generated having a predetermined unit interval. Received data may then be compared to the virtual clock to determine whether more than one data change occurs during a particular unit interval. If more than one data change occurs during a particular unit interval, the virtual clock may not correspond to the source clock. The virtual clock may then be incremented by a phase shift offset and the data analyzed again. When a phase shift virtual clock is identified that aligns with the data such that a plurality of data changes do not occur during a given unit interval, the embodiment may determine that a passing virtual clock may have been identified.

28 Claims, 6 Drawing Sheets

SYSTEM AND METHOD FOR CLOCK PHASE RECOVERY

BACKGROUND

Most computing systems depend upon a reliable clock signal to ensure that processing is synchronized. Processors, data input/output devices, memory, and many other devices use clock signals for synchronization. Without a clock signal, processing may be greatly hindered.

When data is transmitted between computers, it is typically desirable to know the clock signal associated with the data. Unfortunately, this clock signal is not always known. Often the clock signal is not sent with the data because it is not desirable to use valuable bandwidth to send the clock. When the clock signal is not transmitted, it is often desirable to know the clock characteristics, such as unit interval and phase, in order to accurately interpret the transmitted data. Furthermore, even if the clock signal is sent, it may become corrupted or the data may not be fully synchronized to the clock. Such occurrences often happen when the clock signal is distorted by noise.

Even when a clock is not distorted by noise, the source clock may not be in phase with the clock on the receiving side of a transmission. When the source clock and receiving clock are out of phase, data may not be correctly interpreted and receipt errors may occur. Further, the more out of phase the clocks are, the greater affect data jitter may have on data reception. Data jitter is a common challenge for data exchange. Data jitter occurs when data is not triggered at precisely the correct moment. If data jitter is too great, data may be received in a different clock cycle, or unit interval, from that in which it was transmitted. If the receiving clock is out of phase from the source clock, and hence the receiving clock edge may occur late in the source clock cycle, this problem may be exacerbated as smaller amounts of data jitter will push the data into the next clock cycle. If the source and destination clocks are closely aligned, a transmission system may handle clock jitter that distorts the data by almost an entire clock cycle and still accurately decode the data. In an exemplary embodiment of the present invention, the destination clock may have a clock edge at a time equivalent to the middle point of the source clock edge. Using such an arrangement, the system 200 may correctly interpret data that occurs up to one half unit interval early or one half unit interval late for a total jitter tolerance of one unit interval. Alternatively, the virtual clock may be aligned with the source clock such that the clock edges occur at substantially identical times. In such an embodiment, the system 200 may not correctly interpret data that arrives early, but may interpret input data that arrives close to one full unit interval after the clock edge. Specific system requirements or data characteristics may prompt the system 200 to be configured for a specific correlation between the source clock edge and the destination clock edge.

If a source clock does not transmit data at precisely the desired clock speed, the destination clock may not be sufficiently synchronized because the destination clock may be set to clock data in at a specific rate. The destination clock may operate correctly for a time, and slowly move out of phase until significant errors occur. After a period of reception errors, the destination clock may move into closer alignment with the source clock to correctly receive data for another period of time. If both clocks are in phase and operate at the same rate, this problem may be greatly reduced.

DETAILED DESCRIPTION OF THE EMBODIMENTS

Figure 1:
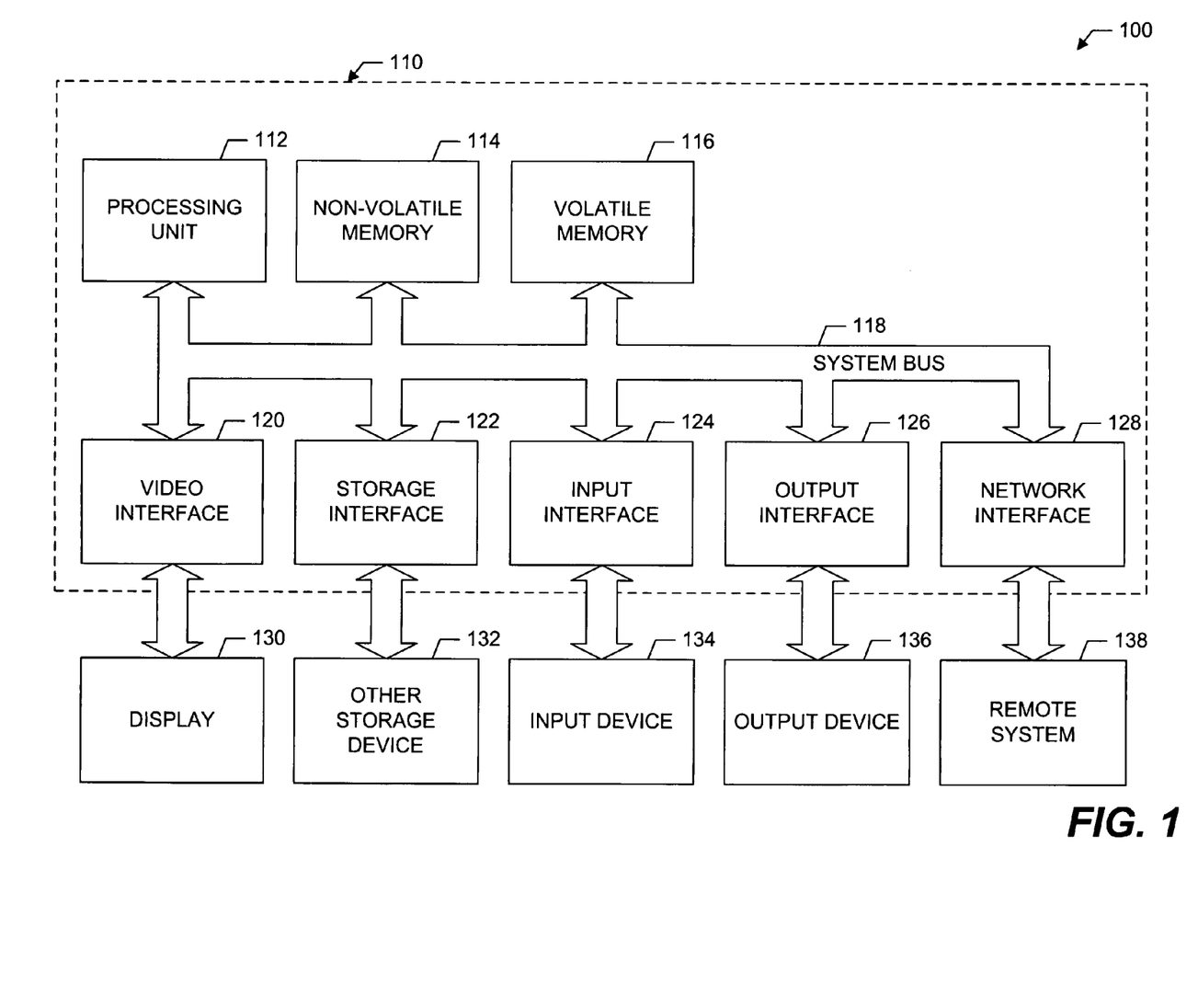
FIG. 1 displays a block diagram representation of an exemplary computing environment in which exemplary embodiments of the present invention may be implemented.

Referring now to the drawings, in which like numerals refer to like parts throughout the several views, FIG. 1 displays a block diagram representation of an exemplary computing environment 100 in which the present invention may be implemented. Exemplary computing environments 100 may include, but are not limited to, personal computers, mainframe computers, servers, hand-held or laptop devices, mobile telephones, multiprocessor systems, microprocessor-based systems, set top boxes, programmable consumer electronics, network PCs, minicomputers, mainframe computers, electronic test equipment, oscilloscopes, logic analyzers, distributed computing environments that include any of the above systems or devices, and the like. However, it should be understood that the features and aspects of exemplary embodiments of the present invention may be implemented by or into a variety of systems and system configurations and any examples provided within this description are for illustrative purposes only.

FIG. 1 and the following discussion provide a general overview of a platform onto which exemplary embodiments of the present invention, or portions thereof, may be integrated, implemented and/or executed. Although in the context of portions of an exemplary environment, the invention may be described as consisting of instructions within a software program being executed by a processing unit, those skilled in the art will understand that portions of an exemplary embodiment of the present invention, or the entire invention itself may also be implemented by using hardware components, state machines, or a combination of any of these techniques. In addition, a software program implementing an embodiment of the present invention may run as a stand-alone program or as a software module, routine, or function call, operating in conjunction with an operating system, another program, system call, interrupt routine, library routine, or the like. The term program module may be used to refer to software programs, routines, functions, macros, data, data structures, or any set of machine readable instructions or object code, or software instructions that may be compiled into such, and executed by a processing unit 112.

Those skilled in the art will appreciate that the computing environment illustrated in FIG. 1 may take on many forms and may be directed towards performing a variety of functions. Generally, the computing environment illustrated in FIG. 1 may be any system that includes a computer processor. Examples of such forms and functions include, but are not limited to, personal computers, hand-held devices such as personal data assistants, note-book computers, mobile telephones, lap-top computers, mainframe computers, servers and a variety of other applications, each of which may serve as an exemplary environment for embodiments of the present invention.

The exemplary computing device 110 may comprise various components including, but not limited to, a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), CDROM, digital versatile disks (DVD) or other optical disk storage, magnetic cassettes, magnetic tape, magneto-optical storage devices, magnetic disk storage or other magnetic storage devices, or any other medium which may be used to store the desired information. The non-volatile memory 114 may provide storage for power-on and reset routines (bootstrap routines) that are invoked upon applying power or resetting the computing device 110. In some configurations the non-volatile memory 114 may proved the basic input/output system (BIOS) routines that may be utilized to perform the transfer of information between elements within the various components of the computing device 110.

The volatile memory 116 may include, but is not limited to, a variety of memory types and devices including, but not limited to, random access memory (RAM), dynamic random access memory (DRAM), bubble memory, registers, or the like. The volatile memory 116 may provide temporary storage for routines, modules, functions, macros, data etc. that are being or may be executed by, or are being accessed or modified by, the processing unit 112.

Alternatively, the non-volatile memory 114 and/or the volatile memory 116 may comprise a remote storage facility accessible through a wired and/or wireless network system. Additionally, the non-volatile memory 114 and/or the volatile memory 116 may comprise a memory system comprising a multi-stage system of primary and secondary memory devices, as described above. The primary memory device and secondary memory device may operate as a cache for the other or the second memory device may serve as a backup to the primary memory device. In yet another arrangement, the non-volatile memory 114 and/or the volatile memory 116 may comprise a memory device configured as a simple database file or as a searchable, relational database using a query language, such as SQL.

The computing device 110 may access one or more external display devices 130 such as a CRT monitor, LCD panel, LED panel, electro-luminescent panel, or other display device, for the purpose of providing information or computing results to a user. In some embodiments, the external display device 130 may actually be incorporated into the product itself. The processing unit 112 may interface to each display device 130 through a video interface 120 coupled to the processing unit 110 over the system bus 118.

The computing device 110 may send output information, in addition to the display 130, to one or more output devices 136 such as a speaker, modem, printer, plotter, facsimile machine, RF or infrared transmitter, computer or any other of a variety of devices that may be controlled by the computing device 110. The processing unit 112 may interface to each output device 136 through an output interface 126 coupled to the processing unit 112 over the system bus 118.

The computing device 110 may receive input or commands from one or more input devices 134 such as a keyboard, pointing device, mouse, modem, RF or infrared receiver, microphone, joystick, track ball, light pen, game pad, scanner, camera, computer or the like. The processing unit 112 may interface to each input device 134 through an input interface 124 coupled to the processing unit 112 over the system bus 118.

It will be appreciated that program modules implementing various embodiments of the present invention may be stored in the non-volatile memory 114, the volatile memory 116, or in a remote memory storage device accessible through the output interface 126 and the input interface 124. The program modules may include an operating system, application programs, other program modules, and program data. The processing unit 112 may access various portions of the program modules in response to the various instructions contained therein, as well as under the direction of events occurring or being received over the input interface 124.

The computing device 110 may provide data to and receive data from one or more other storage devices 132, which may provide volatile or non-volatile memory for storage and which may be accessed by computing device 110. The processing unit 112 may interface to each storage device 132 through a storage interface 122 over the system bus 118.

The interfaces 120, 122, 124, 126, and 128 may include one or more of a variety of interfaces, including but not limited to, cable modems, DSL, T1, V series modems, an RS-232 serial port interface or other serial port interface, a parallel port interface, a universal serial bus (USB), a general purpose interface bus (GPIB), an optical interface such as infrared or IrDA, an RF or wireless interface such as Bluetooth, or other interface.

Figure 2:
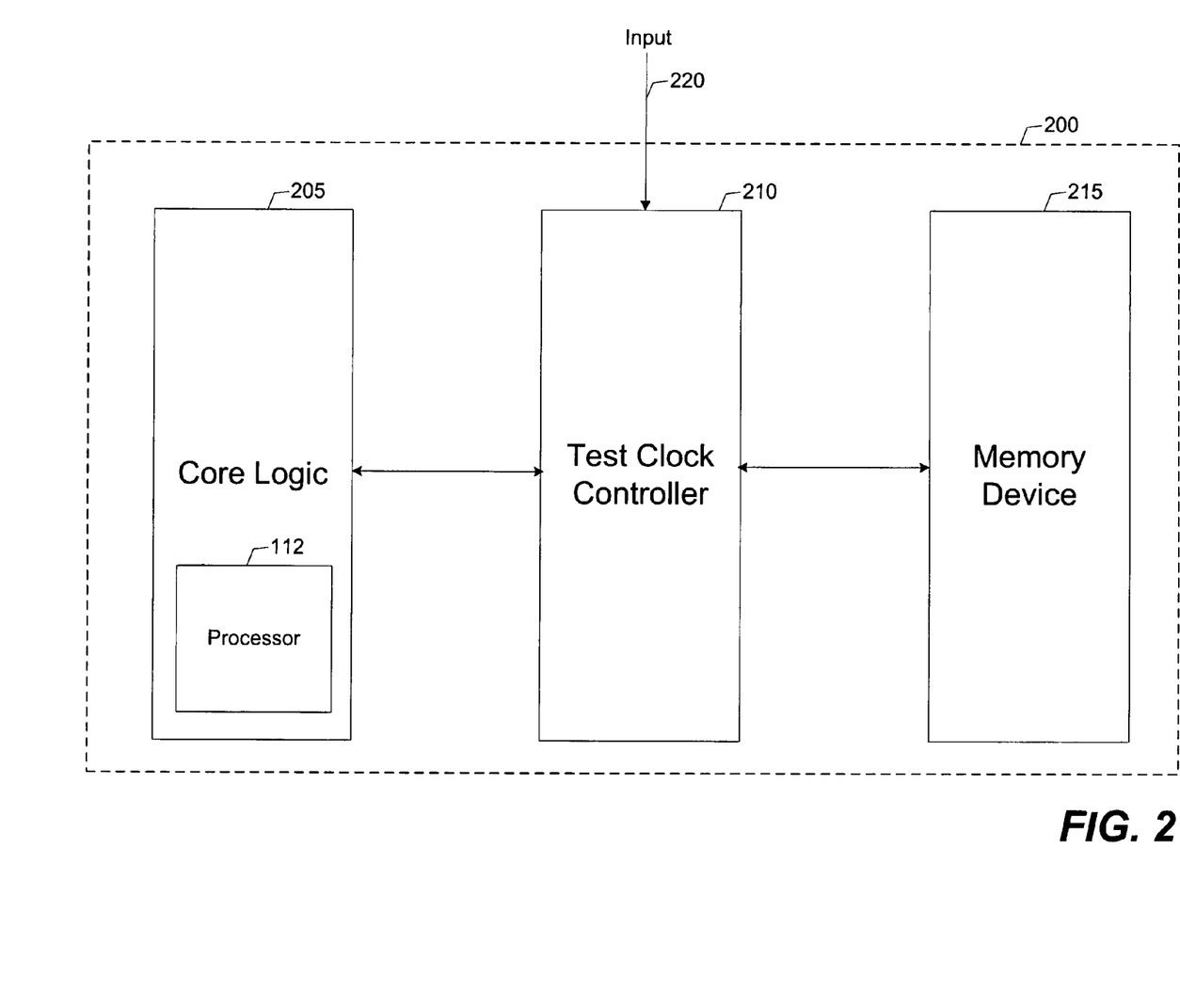
FIG. 2 is a block diagram illustrating an exemplary embodiment of the present invention.

FIG. 2 is a block diagram illustrating an exemplary embodiment of the present invention. As shown in FIG. 2, a system 200 according to an embodiment of the present invention may include a core logic unit 205, a test clock controller 210, and a memory device 215. The core logic unit may include a processor 112 or any other suitable logic processor. The memory device 215 may be implemented using non-volatile memory 114, volatile memory 116, or any other device capable of storing data. The test clock controller 210 may also coordinate the logical processes carried out by the system 200. Alternatively, the functionality of the test clock controller 210 may be performed by the core logic unit 205 or other suitable device. The test clock controller 210 may be implemented in software or hardware.

In an exemplary embodiment of the present invention, the test clock controller 210 may be used to generate virtual clock signals for use by the system 200 to test against received data. The test clock controller 210 may typically generate clock signals having various frequencies and thus various unit intervals. Further, the test clock controller 210 may phase shift the virtual clock signals to correlate the starting point (time zero) of the virtual clock with a source clock.

In an exemplary embodiment of the present invention, the system 200 may be utilized to recover a clock signal's phase and period (unit interval) from a received data stream. Additionally, the system 200 may also be used to recover data and derive jitter statistics using the data and the recovered clock parameters (phase and period). Generally, the system 200 may receive a data stream on an input 220 and identify timestamps representative of the time when the data changes. A data change may be identified when a received data stream has an input value different for a particular sample than it did for the preceding sample. Typically, a data change occurs at a zero crossing and thus the system 200 may identify and timestamp zero crossings found in the received data. Typically, data changes are intended to occur very close in time to a clock edge. The data change may be offset from the clock edge due to timing characteristics of the hardware, but such timing characteristics typically remain relatively stable. Additional variation may be caused by jitter or noise.

The system 200 may be operable to sample data at a rate faster than the anticipated clock rate to assure that the data changes identified are accurately represented in time relative to each other. Those skilled in the art may recognize that the higher the sampling rate, the higher the probability that the timing of the data changes will be identified accurately. When a slower sampling clock is used, a data change may occur and the sampling clock may not sample the data, and thus identify a change, for a potentially significant period of time. However, various embodiments of the present invention may still operate satisfactorily using a slower sampling rate. Hardware and software capabilities along with various other factors such as, but not limited to, cost, available resources, and system requirements, may affect design choices regarding the speed at which data is sampled.

In an exemplary embodiment of the present invention, data may be input 220 and stored to a memory device 215. The data may be stored raw with all incoming data samples being stored along with timestamps, or it may be filtered to store a subset of the input data and associated timestamp data. In an exemplary embodiment of the present invention, the system 200 may only store input data representative of data changes and the associated timestamp data assocaited with the data change. Thus, the timestamps in a timestamp list would identify the presence of a data change or zero crossing.

In an exemplary embodiment, the system may input all of the data, store the desired input data and associated timestamp data, and then derive the clock signal using the received data. Alternatively, the system 200 may derive the clock signal while it is receiving data. In such an embodiment, the clock signal may require adjustment as additional data is received. When a larger amount of data is used to derive the clock signal, there may be a greater probability that the derived clock signal will replicate the original clock signal. However, for most applications, it is not necessary to replicate the original clock signal perfectly. For such applications, the derived clock should correspond sufficiently to the original clock such that input data is identified as arriving during the correct clock cycle.

The system 200 may derive a virtual clock by analyzing the timestamps of the input data changes and identifying a virtual clock that yields a clock edge between every data change. In most synchronous data transmission systems, data remains constant for one or more clock periods and should not change more than once in a given clock period. Thus, by analyzing the timestamps of data changes, the system 200 may recreate a virtual clock that is accurately synchronized to the data. In an exemplary embodiment of the present invention, the system 200 may expect the incoming data to arrive based on a known source clock having a known frequency, and thus a known unit interval. It is common to use a specified clock speed for incoming data.

Unfortunately, even when the clock speed is specified, the system 200 typically may not know where the clock edges fall when data arrives because it may not be synchronized in phase to the source clock. Thus, even when using the correct unit interval, the system 200 may be out of phase. Accordingly, it may be desirable to derive the phase for the incoming clock even when the clock speed is known. Those skilled in the art are familiar with the concepts of clock speed and phase and their corresponding effect on deciphering transmitted data.

Figure 3:
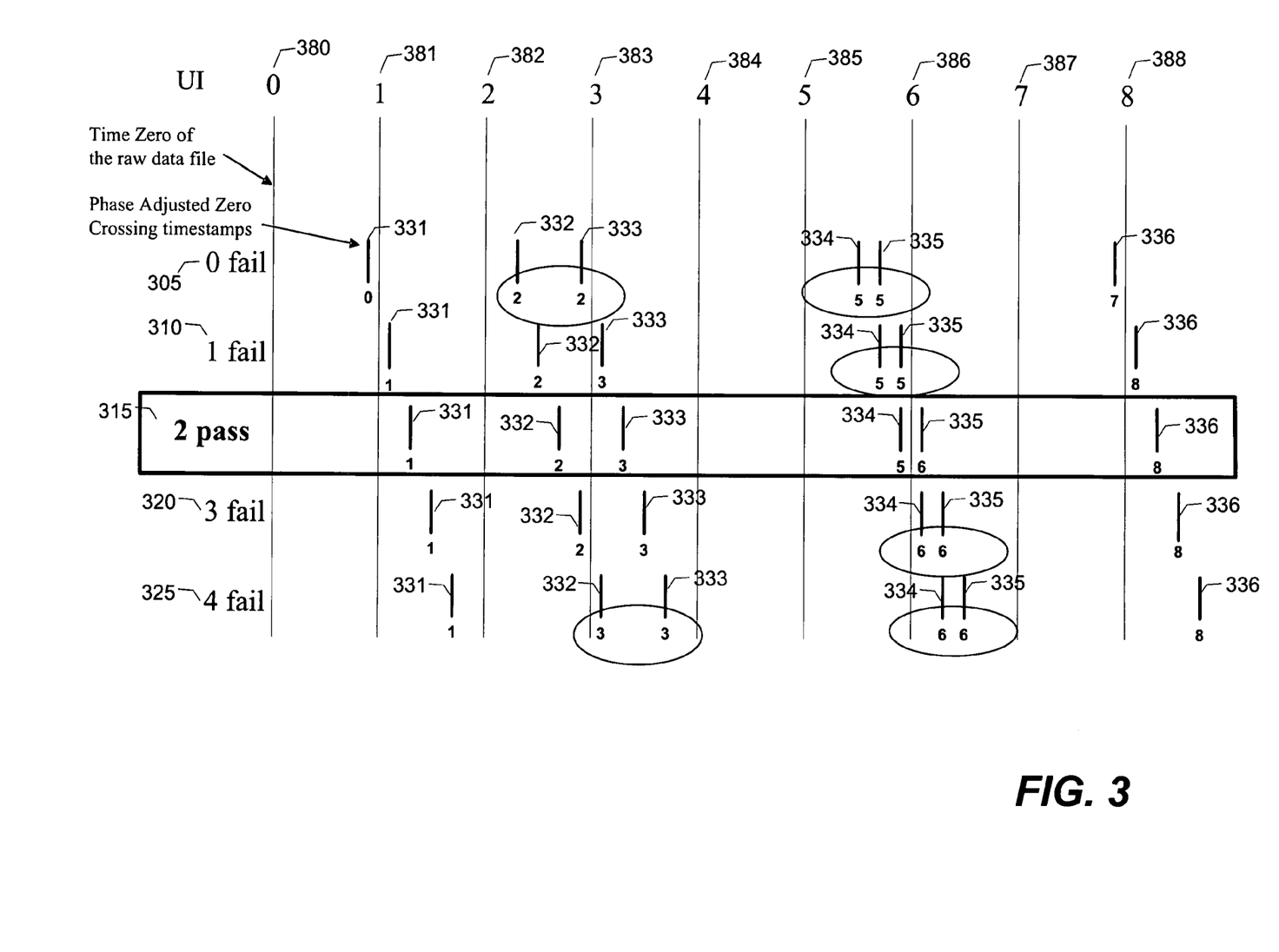
FIG. 3 is a timing diagram illustrating clock timing in an exemplary embodiment of the present invention.

FIG. 3 is a timing diagram illustrating the clock timing in an exemplary embodiment of the present invention. FIG. 3 shows a data sequence correlated to a plurality of virtual clock phases. The virtual clock may be identified by a unit interval (UI) indicative of the unit of time between successive clock edges of the same type (rising or falling). For example, and not limitation, a 1 GHz clock has a unit interval, or period, of 1 ns. Thus, a 1 GHz clock has a clock edge every 1 ns and data sampled during that interval may be associated with the preceding clock edge. FIG. 3 shows five different data set offsets 305, 310, 315, 320, and 325 that are substantially identical except for different phase timing. Each data set 305, 310, 315, 320, and 325 is offset to correspond to a different timing phase. Conceptually, FIG. 3 could have been shown with the data sets being held steady and the clock edges being shifted a portion of a unit interval to reflect different phase offsets for the virtual clocks. Instead, FIG. 3 shows the clock edges at consistent intervals and shifts the data sets to correspond to the phase shift of an associated virtual clock. Thus, each data set may be based on a clock having the same unit interval, but the data sets 305, 310, 315, 320, and 325 are offset from one another thus are out of phase. In other words, each data set 305, 310, 315, 320, and 325 begins its data cycle at a different point in the unit interval. Of the five data set offsets, data set number 2 (315) may represent an accurate depiction of where the date should fall within the virtual clock and it may be in the correct phase with the input data.

To be a valid offset, each data change 331, 332, 333, 334, 335, and 336 should occur during a different unit interval 381, 382, 382, 385, 386, and 388 of the virtual clock. For data set offset 0 (305), the first data change 331 occurs during unit interval 0 (380). The second data change 332 occurs during unit interval 2 (382). The third data change 333 also occurs during unit interval 2 (382). The forth data change 334 occurs during unit interval 5 (385). The fifth data change 335 also occurs during unit interval 5 (385). The sixth data change 336 occurs during unit interval 7 (387). Since the second 332 and third 333 data changes occurred in the same unit interval (382), data set offset 0 (305) is not in phase with a correct virtual clock. Stated another way, data set offset 0 is based on a virtual clock that is not sufficiently similar to the source clock to produce accurate data recovery results. Similarly, data set offset 1 (310) is not based on a correct virtual clock and is not in phase with the source clock because data changes 4 and 5 (334, 335) occurred in the same unit interval (385). Accordingly, it may be seen that any time two or more data changes occur in the same unit interval, the data is not based on a virtual clock that is a correct or passing virtual clock. For a data set offset to pass the test, it must be based on a virtual clock having a substantially similar unit interval and be offset by a substantially similar phase offset as compared to the source clock. When the data is read using an virtual clock that sufficiently replicates the characteristics of the source clock, the data may be accurately recovered.

For data set offset 2 (315), the first data change 331 occurs during unit interval 1 (381). The second data change 332 occurs during unit interval 2 (382). The third data change 333 occurs during unit interval 3 (383). The forth data change 334 occurs during unit interval 5 (385). The fifth data change 335 occurs during unit interval 6 (386). The sixth data change 336 occurs during unit interval 8 (388). Thus, each data change occurs during a different unit interval. Accordingly, data set offset 2 (315) is potentially based on an accurate virtual clock. Such potential accurate virtual clocks may be referred to as having "passed" the phase test. Those skilled in the art will recognize that for any given data stream, there may be a plurality of passing virtual clocks. By varying the unit interval length and a phase offset, one may identify a range of passing virtual clocks and multiple clock frequencies and phase offsets in that range may be used as the virtual clock.

Additionally, data set offsets 3 (320) and 4 (325) fail the test because they each have two or more data changes that occur in one or more unit intervals. Thus, data sets 0 (305), 1 (310), 3 (320), and 4 (325) are not based on virtual clocks that are sufficiently in phase with the source clock and do not appear to be based on potentially valid virtual clocks. This failure may be identified because for each of these data set offsets, at least one unit interval includes more than one data change. Similar results may be seen for the other failing data set offsets. Since multiple data changes occurred during a given unit interval for each of these "failing" clocks, they should not be selected as a receiving clock.

It should be appreciated that each of the data set offsets 305, 310, 315, 320, and 325 may represent a data set received with reference to a virtual clock having a virtual clock period and phase. Thus, a "passing" data set offset identifies a "passing" virtual clock in which the virtual clock has a period and phase which are close enough to the source clock to accurately interpret the data received.

Figure 4:
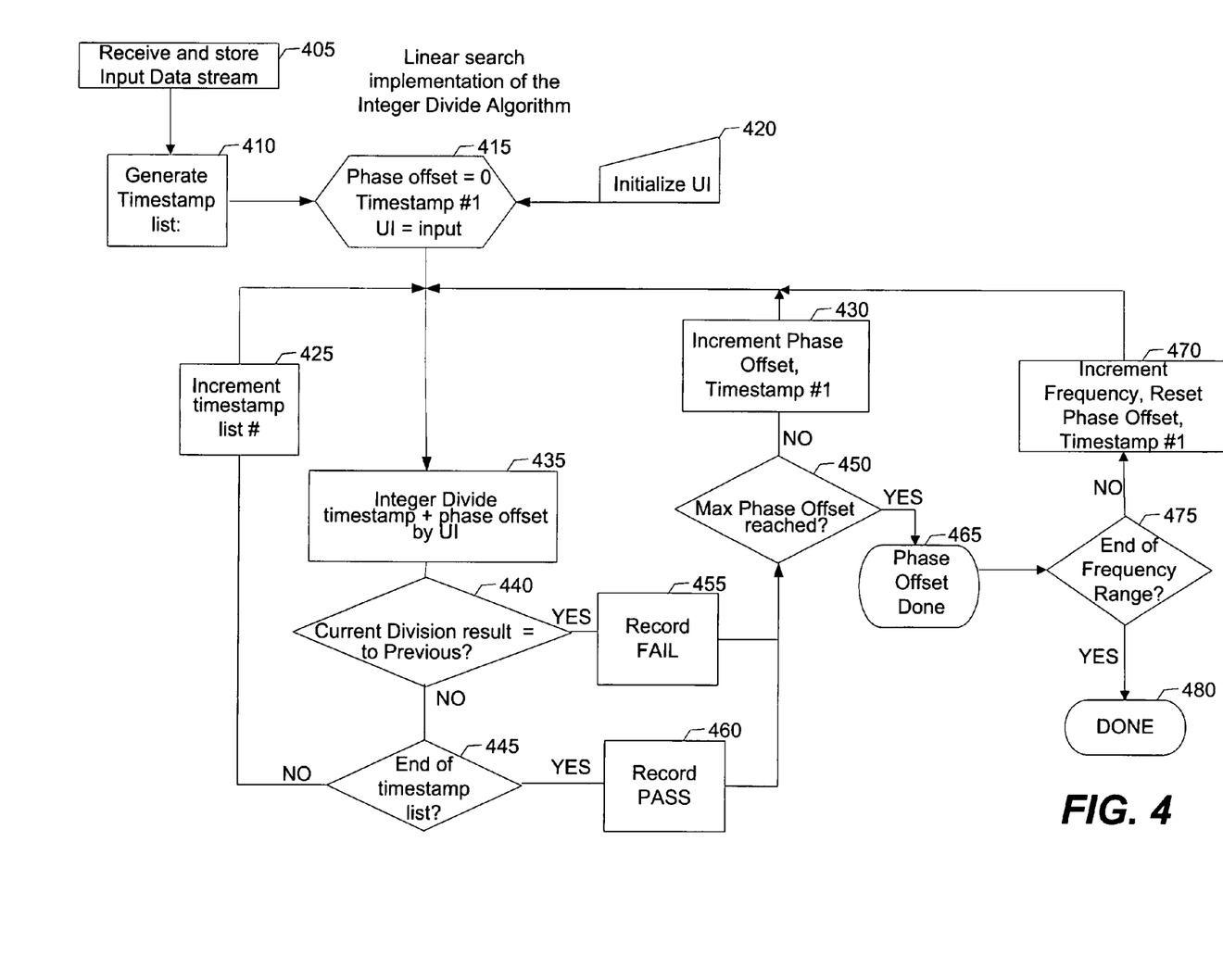
FIG. 4 is a flow diagram illustrating a method of phase searching for use in identifying a passing virtual clock in accordance with an exemplary embodiment of the present invention.

FIG. 4 is a flow diagram illustrating a method of phase searching for use in identifying a passing virtual clock in accordance with an exemplary embodiment of the present invention. First, the system 200 may receive data and store it to a memory device 215. The system 200 may receive and store an entire data stream before testing, or begin testing a portion of a data stream as it is received. In an exemplary embodiment of the present invention, the system 200 may 410 organize the data in the memory device 215 and organize the data in a timestamp list. The timestamp list may be series of data elements identified by a timestamp representative of the time when the data element was received. The timestamps may represent an actual time, a relative time based on when the first data element was received, or a relative time based upon some other event or criteria. The system 200 may store all data elements with a timestamp, or a subset of the data. In an exemplary embodiment of the present invention, the system 200 may only store data elements and timestamps when a data element changes. Thus, the system 200 identifies that any data elements between two data change points have the same data. Thus, if several clock cycles or unit intervals pass between successive stored data elements and time stamps, the system 200 can identify data value received during those unit intervals because the data is the same as the previously received data element. Using the system 200, data recovery is possible because the system 200 may decipher the incoming data using a passing virtual clock and accurately receive the data. Essentially, once a passing virtual clock is identified, data recovery may be as simple as reading the data based on the virtual clock.

In an exemplary embodiment of the present invention, the system 200 may 420 initialize the unit interval to a predetermined expected clock speed unit interval. This unit interval may typically represent the nominal clock speed expected for the input data. The system 200 may then test the unit interval across various phase offsets to find a clock phase that correctly interprets the data. If no clock phase produces satisfactory results, the system 200 may change the unit interval or try a different unit interval and repeat the phase test to identify whether this second clock speed having a second unit interval produces improved results. The change may increment or decrement the unit interval, as desired, and may be by a fixed or a variable amount. For convenience, the discussion below discusses the situation where the unit interval is incremented.

Using the initialized unit interval, the system 200 may 415 begin the test by initializing the phase offset to 0. When the phase offset is zero, the system 200 may treat the first data timestamp as occurring at time zero. Through the phase search, the system 200 may then increment through various phase offsets to find suitable phases. Typically, the system may increment the phase by a predetermined time interval or by a percentage of the total unit interval. After initializing the phase offset, the system 200 may examine 435 the first timestamp data. This may be performed by adding the phase offset to the timestamp and integer dividing this sum by the unit interval. Adding the phase offset to the timestamp phase shifts the data for comparison to the virtual clock. Integer dividing the phase shifted timestamp by the unit interval identifies in which unit interval, or clock cycle, the timestamp occurs. Thus, in FIG. 3, the first data change timestamp 331 occurs during unit interval 0 (380) for data set offset 0 (305).

If 440 the integer division result is equal to the previous result, the test fails 455. This indicates that two data changes were found to occur in the same unit interval thus at least one of the clock speed or phase must not be correct. If the integer division result indicates that the data change occurred in a different unit interval from the previous timestamp, then the system 200 determines 440 whether all timestamps have been examined. If there are still timestamps left in the list, the timestamp list is incremented 425 and the next timestamp is tested 435.

If 445 the end of the timestamp list is reached without any timestamps being found in the same unit interval, the virtual clock may be identified and recorded 460 as a passing clock signal. This indicates that the virtual clock signal may be used for the data and may be an accurate representation of the source clock. Typically, more than one phase offset may produce a passing result. Thus, it may be desirable to test all phases across a phase range to determine the range of passing clock phases. Thus, after a phase test is complete, either by a phase failing 455 or passing 460 the test, the system 200 may determine whether the maximum phase offset has been reached 450 and then increment the phase offset 430 if the maximum has not been reached. If the maximum phase offset has been reached, the phase test for the particular unit interval is complete 465. If the system 200 decides to increment the phase offset and test another phase, the system 200 resets the timestamp counter to the first timestamp entry 430 and repeats the phase test on the timestamp data set. Conceptually, one could view this as sliding a ruler, with unit interval markers, across the time-stamped data until a ruler position is reached where only one time-stamp occurs in a unit interval.

In addition to identifying multiple phase offsets that produce favorable results using the data, the system 200 may test multiple clock speeds having multiple unit intervals to identify a range of passable clock speeds. This may be desirable when identifying the actual source clock speed when the source clock is not actually operating at its normal speed or if the source clock is not known. If the source clock is not known, the system 200 may search various clock speeds by initializing the unit interval and running the phase search test on a plurality of unit intervals unit a satisfactory unit interval is identified. Additionally, by testing a plurality of unit intervals and phase offsets, a passing region may be determined for each.

After the system 200 completes 465 the phase offset portion of the test, it may determine whether 475 the potential frequency range has been tested. If 475 the entire frequency range was been tested, then the test is complete 480. If 475 the end of the frequency range has not been reached, the system 200 may increment 470 the frequency, reset the phase offset and reset the timestamp list. This 470 prepares the system 200 to perform a phase test on the next potential clock frequency. Various algorithms may be used to identify a passing clock frequency. Typically, the system 200 will change the clock speed to test various speeds. The change in clock speed may be performed by incrementing or decrementing the frequency. Further, the system 200 may operate to start with a probable clock frequency and alternate between incrementing and decrementing the frequency to progressively test frequencies faster than and slower than the initial test frequency.

Figure 5:
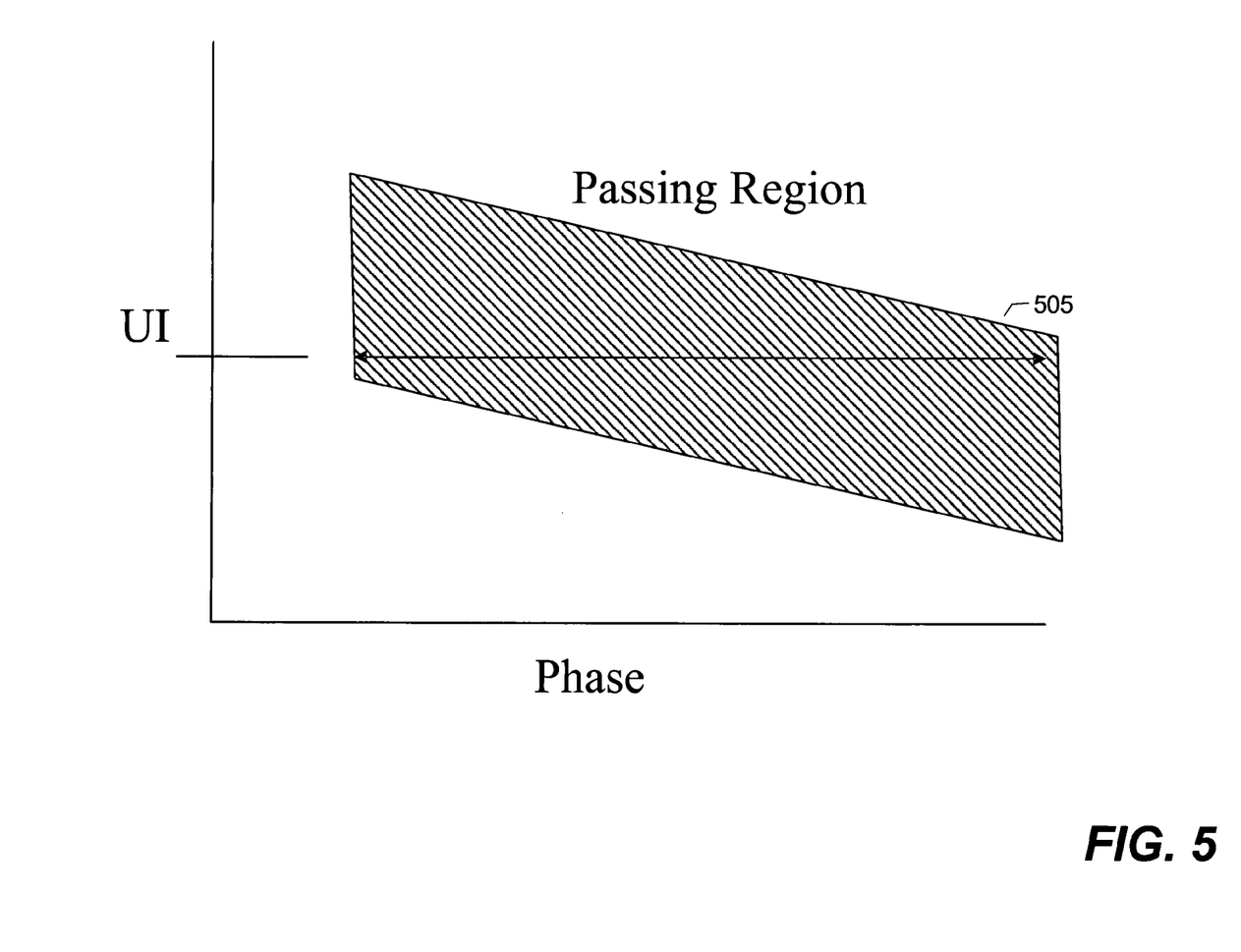
FIG. 5 is a passing region diagram illustrating a passing region in an exemplary embodiment of the present invention.

FIG. 5 is a passing region diagram illustrating a passing region 505. The actual shape of the passing region may vary and may not be a parallelogram as shown in FIG. 5. As may be seen in FIG. 5, the passing region may extend over a range of unit intervals and a range of phases. Any unit interval and phase offset in the passing region will produce passing results when tested against the timestamp data. It may be desirable to use a unit interval and phase offset near the center of the widest portion of the passing region as that area is likely to be closest to the actual source clock unit interval and phase and thus not as susceptible to minor changes in the source clock frequency and/or phase.

Figure 6:
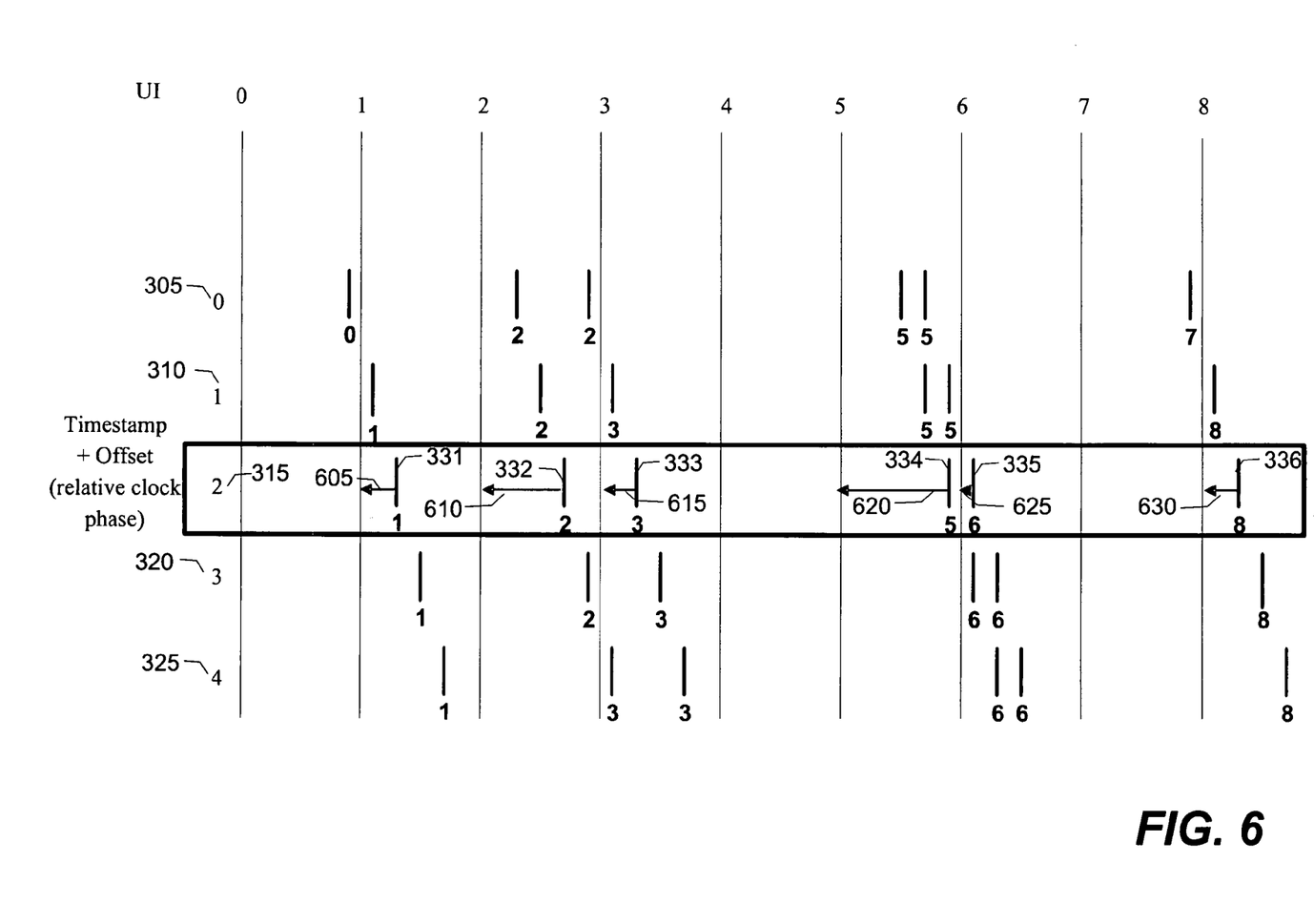
FIG. 6 is a timing diagram illustrating the clock jitter in an exemplary embodiment of the present invention.

After a virtual clock is identified and selected, the system may measure jitter on the data input. In such testing, data jitter is measured relative to the recovered (virtual) clock. Using the virtual clock and the data samples, the jitter analysis may be performed relatively simply compared to other jitter analysis methods. FIG. 6 is a timing diagram illustrating the jitter in an exemplary embodiment of the present invention. As shown in FIG. 6, each timestamp is compared to the passing virtual clock 315 to determine the offset from the clock edge of the unit intervals. FIG. 6 identifies the offsets between the data timestamps and the virtual clock edges using arrows 605, 610, 615, 620, 625, and 630. As may be seen in FIG. 6, the offset varies for each timestamp. Such results are common and may be caused by jitter. Jitter refers to the fluctuation, i.e., the timing offset, of a clock or data edge from the ideal timing of an event. The system 200 may calculate the clock or data jitter. Those skilled in the art are familiar with the uses of jitter calculations and how such calculations may be used in system optimization.

The descriptions of the various embodiments are not intended to limit the scope of the invention in any way and other alternative embodiments may be practiced without departing from its spirit and scope. Accordingly, the scope of the present invention may be defined by the appended claims rather than the foregoing description.

We claim:

1. A system, comprising:
   a clock unit adapted to generate a first clock having a first clock unit interval and a first clock phase offset; and
   a processing unit adapted to: add the first phase offset to a first timestamp of a plurality of timestamps to generate a first offset timestamp, integer divide the first offset timestamp by the first clock unit interval to identify a first integer, add the first phase offset to a second timestamp of the plurality of timestamps to generate a second offset timestamp, integer divide the second offset timestamp by the first clock unit interval to identify a second integer, and determine whether the first and second integers are equal.

2. The system of claim 1, further comprising a memory adapted to receive a plurality of data elements, each data element being associated with a timestamp, and to store the plurality of data elements and timestamps.

3. The system of claim 1, wherein the processing unit is further adapted to determine that the first clock is not a passing clock signal if the first and second integer are equal.

4. The system of claim 1, wherein the processing unit is further adapted to add the first phase offset to each timestamp of said plurality of timestamps to generate a plurality of offset timestamps, integer divide each of said plurality of offset timestamps by the first clock unit interval to identify a plurality of integers, and determine whether any of the plurality of integers are equal.

5. The system of claim 4, wherein the processing unit is further adapted to determine that the first clock is a passing clock signal if none of the plurality of integers are equal.

6. The system of claim 4, wherein the processing unit is further adapted to determine that the first clock is not a passing clock signal if any of the plurality of integers are equal.

7. The system of claim 6, wherein:
   the clock unit is further adapted to generate a second clock having a second clock unit interval and a second clock phase offset; and
   the processing unit is further adapted to: add the second phase offset to the first timestamp of the plurality of timestamps to generate a third offset timestamp, integer divide the third offset timestamp by the second clock unit interval to identify a third integer, add the second phase offset to the second timestamp of the plurality of timestamps to generate a fourth offset timestamp, integer divide the forth offset timestamp by the second clock unit interval to identify a forth integer, and determine whether the third and forth integers are equal.

8. The system of claim 7, wherein the first and second clock unit intervals are equal.

9. The system of claim 8, wherein the first and second clock phase offsets are equal.

10. The system of claim 7, wherein the processing unit is further adapted to determine a range of passing phase offsets.

11. The system of claim 7, wherein the processing unit is further adapted to determined a range of passing unit intervals.

12. The system of claim 6, wherein:
   the clock unit is further adapted to generate a second clock having the first clock unit interval and a second clock phase offset; and
   the processing unit is further adapted to: add the second phase offset to the first timestamp of the plurality of timestamps to generate a third offset timestamp, integer divide the third offset timestamp by the first clock unit interval to identify a third integer, add the second phase offset to the second timestamp of the plurality of timestamps to generate a forth offset timestamp, integer divide the forth offset timestamp by the first clock unit interval to identify a forth integer, and determine whether the third and forth integers are equal.

13. The system of claim 1, further comprising a core logic unit.

14. The system of claim 1, further comprising a memory device.

15. A method, comprising:
generating a first clock having a first clock unit interval and a first clock phase offset;
adding the first phase offset to a first timestamp of a plurality of timestamps to generate a first offset timestamp;
integer dividing the first offset timestamp by the first clock unit interval to identify a first integer;
adding the first phase offset to a second timestamp of the plurality of timestamps to generate a second offset timestamp;
integer dividing the second offset timestamp by the first clock unit interval to identify a second integer; and
determining whether the first and second integers are equal.

16. The method of claim 15, further comprising:
receiving a plurality of data elements, each data element being associated with a timestamp; and
storing the plurality of data elements and timestamps.

17. The method of claim 15, further comprising:
determining that the first clock is not a passing clock signal if the first and second integers are equal.

18. The method of claim 15, further comprising:
adding the first phase offset to each timestamp of said plurality of timestamps to generate a plurality of offset timestamps;
integer dividing each of said plurality of offset timestamps by the first clock unit interval to identify a plurality of integers;
determining whether any of the plurality of integers are equal.

19. The method of claim 18, further comprising:
determinig that the first clock is a passing clock signal if none of the plurality of integers are equal.

20. The method of claim 19, further comprising:
determining that the first clock is not a passing clock signal if any of the plurality of integers are equal.

21. The method of claim 20, further comprising:
generating a second clock having a second clock unit interval and a second clock phase offset;
adding the second phase offset to the first timestamp of the plurality of timestamps to generate a third offset timestamp;
integer dividing the third offset timestamp by the second clock unit interval to identify a third integer;
adding the second phase offset to the second timestamp of the plurality of timestamps to generate a forth offset timestamp;
integer dividing the forth offset timestamp by the second clock unit interval to identify a forth integer; and
determining whether the third and forth integers are equal.

22. The method of claim 21, wherein the first and second clock unit intervals are equal.

23. The method of claim 21, wherein the first and second clock phase offsets are equal.

24. The method of claim 21, further comprising determining a range of passing phase offsets.

25. The method of claim 21, further comprising determining a range of passing unit intervals.

26. The method of claim 20, further comprising:
generating a second clock having the first clock unit interval and a second clock phase offset;
adding the second phase offset to the first timestamp of the plurality of timestamps to generate a third offset timestamp;
integer dividing the third offset timestamp by the first clock unit interval to identify a third integer;
adding the second phase offset to the second timestamp of the plurality of timestamps to generate a forth offset timestamp;
integer dividing the forth offset timestamp by the first clock unit interval to identify a fourth integer; and
determining whether the third and forth integers are equal.

27. The method of claim 15, wherein at least one of the steps of adding the first phase offset to a first timestamp of a plurality of timestamps to generate a first offset timestamp; integer dividing the first offset timestamp by the first clock unit interval to identify a first integer; adding the first phase offset to a second timestamp of the plurality of timestamps to generate a second offset timestamp; integer dividing the second offset timestamp by the first clock unit interval to identify a second integer; and determining whether the first and second integers are equal is performed using a core logic unit.

28. A computer-readable medium comprising computer-executable instructions which execute on a computer to cause the computer to perform the steps comprising:
generating a first clock having a first clock unit interval and a first clock phase offset;
adding the first phase offset to a first timestamp of a plurality of timestamps to generate a first offset timestamp;
integer dividing the first offset timestamp by the first clock unit interval to identify a first integer;
adding the first phase offset to a second timestamp of the plurality of timestamps to generate a second offset timestamp;
integer dividing the second offset timestamp by the first clock unit interval to identify a second integer; and
determining whether the first and second integers are equal.

* * * * *